(12) United States Patent
Weiner et al.

(10) Patent No.: US 12,422,621 B2
(45) Date of Patent: Sep. 23, 2025

(54) SPECTRAL COMPRESSION SYSTEM AND METHODS OF USING SAME

(71) Applicant: PURDUE RESEARCH FOUNDATION, West Lafayette, IN (US)

(72) Inventors: Andrew Marc Weiner, West Lafayette, IN (US); Karthik Vijay Annur Myilswamy, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 296 days.

(21) Appl. No.: 17/961,426

(22) Filed: Oct. 6, 2022

(65) Prior Publication Data
US 2025/0012977 A1    Jan. 9, 2025

Related U.S. Application Data

(60) Provisional application No. 63/253,315, filed on Oct. 7, 2021.

(51) Int. Cl.
*G02B 6/293* (2006.01)
*G02F 1/21* (2006.01)
*G02B 6/12* (2006.01)

(52) U.S. Cl.
CPC ..... *G02B 6/29338* (2013.01); *G02B 6/29352* (2013.01); *G02B 6/29359* (2013.01); *G02F 1/212* (2021.01); *G02B 6/12007* (2013.01)

(58) Field of Classification Search
CPC ............ G02B 6/12007; G02B 6/29338; G02B 6/29352; G02B 6/29359
See application file for complete search history.

(56) References Cited

U.S. PATENT DOCUMENTS

| | | | |
|---|---|---|---|
| 9,634,464 B2 | 4/2017 | Yvind | |
| 10,372,014 B1* | 8/2019 | Vidrighin | G02F 1/3536 |
| 11,003,046 B2* | 5/2021 | Liscidini | G02B 6/29343 |
| 11,112,671 B2 | 9/2021 | Abdulhalim | |
| 11,226,538 B2* | 1/2022 | Marandi | G02F 1/39 |
| 2014/0193155 A1* | 7/2014 | Popovic | H04J 14/0307 |
| | | | 29/428 |

FOREIGN PATENT DOCUMENTS

CA    2189664 C  * 10/2002  ........... H04L 7/0075

OTHER PUBLICATIONS

Yuanhua Li et al., "Spectral compression of single-photon-level laser pulse", Sci Rep. 7:43494, Feb. 27, 2017, doi: 10.1038/srep43494, pp. 1-7 (Year: 2017).*

* cited by examiner

*Primary Examiner* — Daniel Petkovsek
(74) *Attorney, Agent, or Firm* — Edmonds & Cmaidalka, P.C.

(57) ABSTRACT

Systems and methods for generating spectrally compressed photons from broadband emitted photon pulses. The system can include an input coupling having a first coupling ratio and an output coupling having a second coupling ratio. The first coupling ratio is configurable and the second coupling ratio is fixed. A cavity can be connected to the input coupling and the output coupling. A controller in electrical communication with the coupling device can be configured to change the first coupling ratio of the input coupling.

20 Claims, 5 Drawing Sheets

SPECTRAL COMPRESSION SYSTEM AND METHODS OF USING SAME

GOVERNMENT LICENSE RIGHTS

This invention was made with government support under ECCS-1809784 awarded by National Science Foundation and FA9550-15-1-0211 awarded by Air Force Office of Scientific Research. The government has certain rights in the invention.

BACKGROUND

Field

Embodiments provided herein relate to spectral compression. More particularly, embodiments of the present disclosure relate to spectral compression, quantum information, and networking.

Description of the Related Art

An optical cavity consists of optical components positioned in a manner that enables the light to be confined and circulate in a closed path. A cavity generally consists of two ports, namely, input and output ports that are characterized by their coupling coefficients. In a time-invariant cavity, the input and output couplings are fixed. When considering an input optical pulse with finite bandwidth, it suffers from the reflection of frequency components that are significantly detuned from resonance frequencies.

A microring resonator ("MRR") is an integrated photonics device that is an optical waveguide that loops back on itself forming a cavity. Light is evanescently coupled into the ring by a bus waveguide that is positioned close to the ring. The resonances of an MRR occur when the optical path length is an integer multiple of the input wavelength. At resonance frequencies, most of the light is trapped inside the cavity. Several demonstrations of very compact, low-loss, and high-quality factor (high-Q) MRRs have been realized on-chip in platforms including silicon, silicon nitride, and thin-film lithium niobate ("TFLN"), making it very suitable for integrated photonics. In addition to the circular ring structure, other geometries for the loop-back waveguide can be used to provide the same functionality. For example, a racetrack resonator is one such geometry in which two long straight waveguides are connected by curved sections to form the cavity.

An integrated Mach-Zehnder modulator ("MZM") is an interferometric structure made of an electro-optic material such as lithium niobate, consisting of two beam splitters connected by two arms. The beam splitter may be implemented, for example, using a two-by-two waveguide junction. The input light is split into two arms using a beam splitter and the phase change that the light undergoes in each of the arms is determined by the corresponding voltage applied, called an electro-optic effect. The light in the two arms is then combined using a second beam splitter. Depending on the choice of voltages applied, the input can appear in either one of the two output ports or in a controllable superposition of both output ports. If the MZM is controlled such that an input on the lower input port is coupled completely to the upper output port, the MZM is said to be in the cross state. In the cross state an input on the upper input port will likewise be coupled to the lower output port. Conversely, if the MZM is controlled such that an input on the lower input port is coupled completely to the lower output port, the MZM is said to be in the bar state. In the bar state an input on the upper input port will likewise be coupled to the upper output port. The response of the electro-optic effect in an MZM can be very fast. Accordingly, switching of integrated MZMs, that is from the cross state to the bar state, or vice versa, has been demonstrated at rates corresponding to more than 100 GHz under voltage control.

Linear, time-invariant optical cavities are widely used as spectral filters. However, several new phenomena arise when linear cavities are actively modulated. Dynamical tuning of refractive index has been exploited to experimentally demonstrate adiabatic wavelength conversion in optical cavities, on-chip nonreciprocal transmission of light, frequency comb generation in electro-optic cavities, and optical storage, retrieval, and manipulation in active photonic molecule structures. Numerical studies involving coupled cavities, subjected to dynamic refractive index tuning, predict more novel phenomena including stopping, coherent storage, and time-reversal of light. Dynamically coupled nonlinear cavities have also been proposed to achieve high fidelity deterministic quantum gates for photonic qubits. It is important to note that the dynamical tuning of the cavity for such applications should be achieved in a time scale much shorter than that of the photon lifetime.

In view of strong interest in quantum information and quantum networking, spectral compression is needed to efficiently interface broadband photons, such as those from parametric down-conversion sources, with narrow band nodes, such as quantum dots, color centers and atomic systems. Spectral compression has also been employed in classical applications such as absorption spectroscopy and nonlinear microscopy, such as Raman microscopy. Prior approaches to spectral compression have for the most part relied on nonlinear optical schemes, including self-phase modulation of down-chirped pulses in conventional optical fibers, soliton propagation in dispersion-increasing fibers, sum frequency mixing of broadband pulses with opposite chirps, and second harmonic generation and sum frequency mixing in thick nonlinear crystals with phase matching characteristics dominated by group velocity mismatch. Spectral compression has also been reported using dispersive propagation followed by electro-optic phase modulation, i.e., time lens operation. In one example, the bandwidth of single photons was compressed from 150 GHz to 1.46 GHz, offering one of the most extreme experimental examples.

It is commonly known in the context of mode-locked lasers and frequency combs that when multiple evenly spaced, phase locked frequency modes are present, the resultant temporal pulse width decreases in inverse proportion to the number of frequency modes. As time and frequency obey the duality property of Fourier transform, it is expected that forming multiple, phase-locked temporal copies of the same pulse should result in decrease of the spectral width. One of the most straightforward ways to obtain multiple temporal copies is to use an optical cavity. Without loss of generality, for now consider a Fabry-Perot ("FP") cavity, although the concept is applicable to any generic cavity structure. An FP cavity consists of two mirrors which are characterized by their reflectivities. The reflectivities of the input and output mirror determine the input and output coupling, respectively. Consider an FP cavity with an input mirror (field reflection and transmission coefficients given by $r_1$ and $t_1$ respectively) and an output mirror (field reflection and transmission coefficients given by $r_2$ and $t_2$ respectively) of roundtrip time $T_R$. The relationship between the input ($E_{in}$) and output ($E_{out}$) fields of the FP cavity in time and frequency domains are given by Eq. 1.

$$E_{out}(t) = \sum_{m=0}^{\infty} t_1 t_2 (r_1 r_2)^m E_{in}\left[t - \left(mT_R + \frac{T_R}{2}\right)\right],\quad (1)$$

$$E_{out}(\omega) = \frac{t_1 t_2 e^{-j\omega \frac{T_R}{2}}}{1 - r_1 r_2 e^{-j\omega T_R}} E_{in}(\omega).$$

As is well known, a pulse incident on a FP cavity suffers strong reflection of frequencies that are significantly detuned from the cavity resonance. Hence, even if the cavity transmission is unity on resonance, an isolated input pulse suffers strong insertion loss. Here insertion loss, also referred to as integrated loss, refers to the fraction of the pulse energy at the input prior to mirror $r_1$ which is not transmitted to output. That is, the fraction of input pulse energy that is transmitted to the output of the spectral compression cavity is 1 minus the insertion loss. Energy that is not transmitted is either reflected back to the input side, called reflection loss, or attenuated due to loss mechanisms within the cavity, called cavity loss.

There is a need, therefore, for a method for spectrally compressing broadband photons into narrowband photons in a cavity structure that minimizes insertion loss and does not require strong overlap with a resonant frequency at insertion.

SUMMARY

Systems and methods for generating spectrally compressed photons from broadband emitted photon pulses. The system can include an input coupling having a first coupling ratio and an output coupling having a second coupling ratio. The first coupling ratio is configurable and the second coupling ratio is fixed. A cavity can be connected that has at least two coupling ports, including the input coupling and the output coupling. A controller in electrical communication with the coupling device can be configured to change the first coupling ratio of the input coupling.

In at least one embodiment, the method includes emitting a photon pulse; capturing the photon pulse inside a coupling device comprising: an input coupling having a first coupling ratio, wherein the first coupling ratio is configurable, and an output coupling having a second coupling ratio, wherein the second coupling ratio is configurable; passing the photon pulse through a cavity connected to the input coupling and the output coupling; changing the first coupling ratio of the input coupling and the second coupling ratio of the output coupling with a controller in electrical communication with the coupling device; and emitting a spectrally compressed photon pulse from the coupling device through the output coupling.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are, therefore, not to be considered limiting of its scope, for the invention may admit to other equally effective embodiments. It is emphasized that the figures are not necessarily to scale and certain features and certain views of the figures can be shown exaggerated in scale or in schematic for clarity and/or conciseness.

DETAILED DESCRIPTION

Provided herein are methods and systems for spectral compression using a time-varying, linear optical cavity. Spectral compression is needed for efficient interfacing of broadband photons with narrowband quantum memories for applications in quantum information and networking. Here the term "linear" means that nonlinear optical effects are not involved. Unlike other recent works on time-varying cavities based on modulation of the intracavity phase, the methods and systems for spectral compression provided herein are based on rapid switching of coupling into the cavity. Spectral compression performance metrics are analyzed as a function of mirror reflectivity, cavity loss and switching speed. The methods and systems for spectral compression provided herein are particularly realizable in integrated photonics.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure can repeat reference numerals and/or letters in the various embodiments and across the figures provided herein. This repetition is for the purpose of simplicity and clarity and does not in itself dictate a relationship between the various embodiments and/or configurations. Moreover, the exemplary embodiments presented below can be combined in any combination of ways, i.e., any element from one exemplary embodiment can be used in any other exemplary embodiment, without departing from the scope of the disclosure.

Additionally, certain terms are used throughout the following description and claims to refer to particular components. As one skilled in the art will appreciate, various entities can refer to the same component by different names, and as such, the naming convention for the elements described herein is not intended to limit the scope of the invention, unless otherwise specifically defined herein. Further, the naming convention used herein is not intended to distinguish between components that differ in name but not function.

Furthermore, in the following discussion and in the claims, the terms "including" and "comprising" are used in an open-ended fashion, and thus should be interpreted to mean "including, but not limited to."

The term "or" is intended to encompass both exclusive and inclusive cases, i.e., "A or B" is intended to be synonymous with "at least one of A and B," unless otherwise expressly specified herein.

The indefinite articles "a" and "an" refer to both singular forms (i.e., "one") and plural referents (i.e., one or more) unless the context clearly dictates otherwise. For example, embodiments using "an olefin" include embodiments where one, two, or more olefins are used, unless specified to the contrary or the context clearly indicates that only one olefin is used.

Unless otherwise indicated herein, all numerical values are "about" or "approximately" the indicated value, meaning the values take into account experimental error, machine tolerances and other variations that would be expected by a person having ordinary skill in the art. It should also be understood that the precise numerical values used in the specification and claims constitute specific embodiments. Efforts have been made to ensure the accuracy of the data in the examples. However, it should be understood that any measured data inherently contains a certain level of error due to the limitation of the technique and/or equipment used for making the measurement.

Each of the appended claims defines a separate invention, which for infringement purposes is recognized as including equivalents to the various elements or limitations specified in the claims. Depending on the context, all references to the "invention" may in some cases refer to certain specific embodiments only. In other cases, it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this disclosure is combined with publicly available information and technology.

In at least one particular embodiment, methods for using time-varying cavities for spectral compression are provided. Unlike time-varying cavities based on modulation of the intracavity phase, the spectral compression concept provided herein can be based on rapid switching of coupling into the cavity. Using this rapid switching of coupling into the cavity, a relatively broadband pulse can be captured into a time-varying cavity via electro-optic switching of the input coupling. By using low loss, high Q cavities, spectral compression can be realized, potentially to well below 1 GHz, limited only by the cavity linewidth. As explained in more detail below, input reflectivity can be switched, modulated, or otherwise changed to configure the time variance of the cavity.

Figure 1:
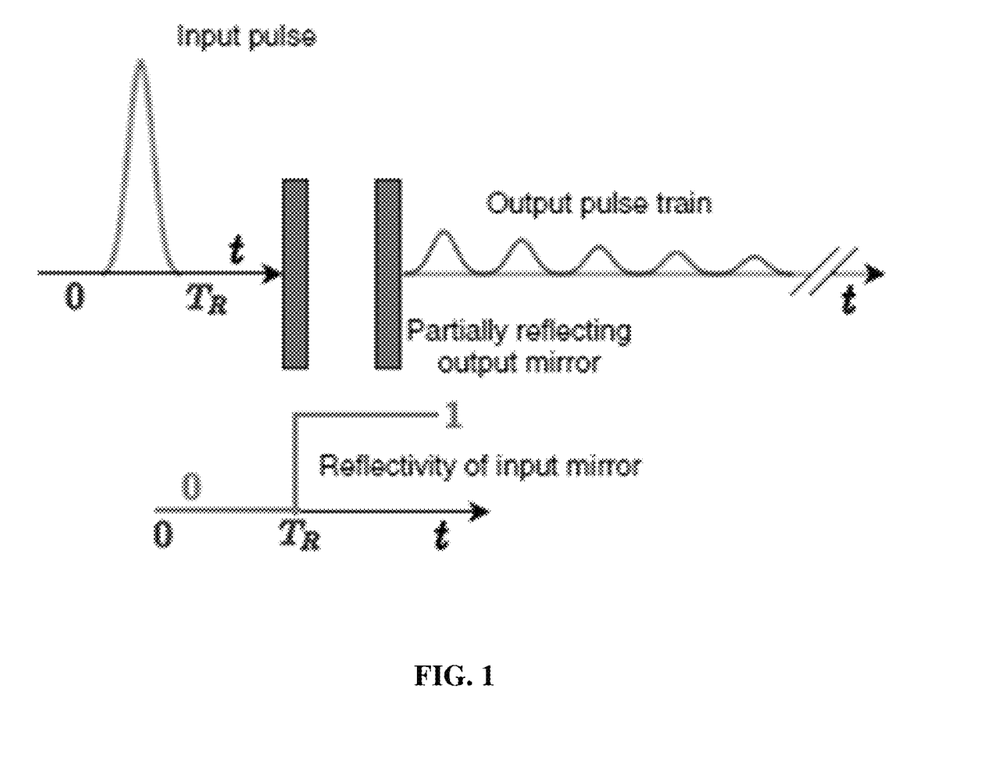
FIG. 1 depicts a time-varying cavity with input mirror reflectivity rapidly switched from zero to unity after the pulse enters the cavity. The output mirror is partially reflecting. In contrast to a Fabry-Perot cavity, no reflection occurs onto the input side. All the energy exits through the output mirror creating an output pulse train with decreasing amplitude resulting in spectral compression.

Referring to FIG. 1, reflection losses can be avoided by switching the reflectivity of the input mirror from zero to unity just after the pulse enters the cavity. If there can be no loss, the entire power can eventually exit through the partially reflecting output mirror. The output can contain multiple copies of the input pulse with decreasing amplitude. Each copy of the input pulse can have a fixed relative delay corresponding to cavity round trip time and can be phase locked to each other. In one or more embodiments, phase lock can lead to spectral compression or spectral narrowing along with increased peak power spectral density, as energy conservation can be ensured.

FIG. 1 depicts a time-varying cavity with input mirror reflectivity rapidly switched from zero to unity after the pulse enters the cavity. The output mirror can be partially reflecting. In contrast to a conventional, or static, Fabry-Perot cavity, no reflection occurs onto the input side. All the energy exits through the output mirror creating an output pulse train with decreasing amplitude resulting in spectral compression.

Considering the time-varying cavity FIG. 1 in more detail, the cavity's input reflection coefficient $r_1$ can be rapidly switched from 0 to 1 at $t=T_R$. For pulses of width less than that of $T_R$ that are input within $t=0$ and $t=T_R$, the output of such a time-varying cavity can be given by Eq. 2. Here, the reflectivity can be essentially switched after the entire pulse energy has been captured inside the cavity. It can be seen that the given relationship can be similar to that of the FP cavity, except for terms $r_1$ and $t_1$ are identically replaced by 1, as a result of rapid switching.

$$E_{out}(t) = \sum_{m=0}^{\infty} t_2(r_2)^m E_{in}\left[t - \left(mT_R + \frac{T_R}{2}\right)\right], \quad (2)$$

$$E_{out}(\omega) = \frac{t_2 e^{-j\omega \frac{T_R}{2}}}{1 - r_2 e^{-j\omega T_R}} E_{in}(\omega).$$

Figure 2A:
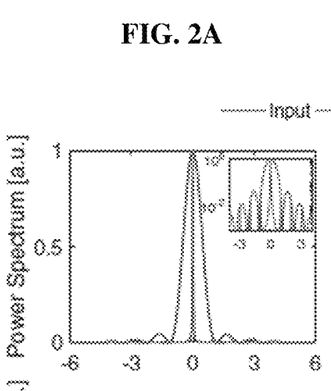
FIG. 2A depicts input and output power spectral densities with respect to a specific cavity resonance frequency. This plot is for a conventional Fabry-Perot cavity ($r_1=r_2=0.95$, both reflectivities are constant in time) for an input pulse of width $T_R$ oscillating at a cavity resonance frequency. Plot is normalized to corresponding maximum input power spectral density. Respective log scale plot is shown in inset to highlight the presence of multiple peaks. The output spectrum is narrowed, but power outside of the transmitted peak is lost.

FIG. 2A depicts input and output power spectral densities with respect to a specific cavity resonance frequency. This plot can be for a conventional Fabry-Perot cavity ($r_1=r_2=0.95$, both reflectivities are constant in time). In this example the input can be a flat-topped pulse of width $T_R$, with sinusoidal leading and trailing edges that together account for a net 25% of the pulse width, as shown in the inset of FIG. 2D, at a carrier frequency coinciding with one of the resonance modes of the cavity. Plot can be normalized to corresponding maximum input power spectral density. Respective log scale plot can be shown in inset to highlight the presence of multiple peaks. The output spectrum can be narrowed, but power outside of the transmitted peak can be lost.

Figure 2B:
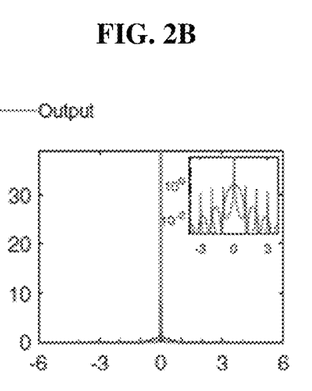
FIG. 2B depicts input and output power spectral densities with respect to a specific cavity resonance frequency for a time-varying cavity. Input reflectivity of time-varying cavity is switched after the pulse enters the cavity. The input and output power spectral densities of the time-varying cavity ($r_2=0.95$) are plotted for a pulse of width $T_R$ oscillating at a cavity resonance frequency. Plot is normalized to corresponding maximum input power spectral density. Respective log scale plot is shown in inset to highlight the presence of multiple peaks. The output spectrum is narrowed, and the transmitted peak has power spectral density substantially above that of the input spectrum.

FIG. 2B depicts input and output power spectral densities with respect to a specific cavity resonance frequency for a time-varying cavity. Input reflectivity of time-varying cavity can be switched after the pulse enters the cavity. The input and output power spectral densities of the time-varying cavity ($r_2=0.95$) are plotted for the same flat-topped pulse of width $T_R$ oscillating at a cavity resonance frequency as considered in the previous paragraph. Plot can be normalized to corresponding maximum input power spectral density. Respective log scale plot can be shown in inset to highlight the presence of multiple peaks. The output spectrum can be narrowed, and the transmitted peak has power spectral density substantially above that of the input spectrum.

The ratio between the output and input power spectral densities attains the maximum at the frequency locations corresponding to the resonance modes for both static FP cavity and time-varying cavity. The corresponding maximum values are given by Eq. 3.

FP cavity:

$$\text{Max}\left\{\left|\frac{E_{out}(\omega)}{E_{in}(\omega)}\right|^2\right\} = 1 - \left(\frac{|r_1|-|r_2|}{1-|r_1||r_2|}\right)^2 \leq 1, \quad (3)$$

Time-varying cavity:

$$\text{Max}\left\{\left|\frac{E_{out}(\omega)}{E_{in}(\omega)}\right|^2\right\} = 1 + \left(\frac{2|r_2|}{1-|r_2|}\right)^2 \geq 1.$$

In case of a passive FP cavity or no gain, the output power spectral density can be less than or equal to the input at all frequencies and can result in spectral filtering. Surprisingly, in the case of the time-varying cavity, the output power spectral density can exceed that of the input at multiple frequency locations, as depicted in the ratio shown in the inset of FIG. 2C.

Figure 2C:
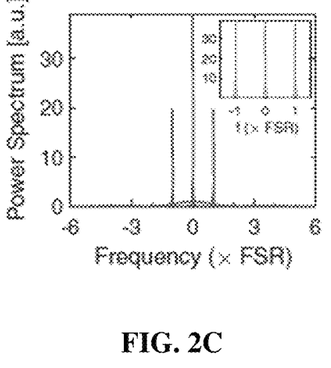
FIG. 2C depicts input and output power spectral densities with respect to a specific cavity resonance frequency for a time-varying cavity. Input reflectivity of time-varying cavity is switched after the pulse enters the cavity. The input and output power spectral densities of the time-varying cavity ($r_2=0.95$) are plotted for a pulse of width $0.5\, T_R$ oscillating at a cavity resonance frequency. Plot is normalized to corresponding maximum input power spectral density. Inset depicts the multiplication factor between input and output power spectra of time-varying cavity.
Figure 2D:
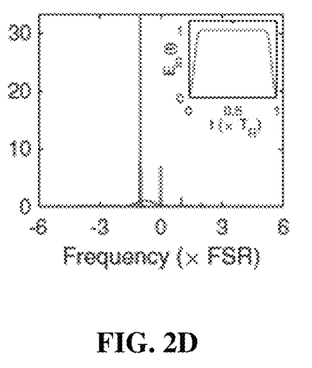
FIG. 2D depicts input and output power spectral densities with respect to a specific cavity resonance frequency for a time-varying cavity. Input reflectivity of time-varying cavity is switched after the pulse enters the cavity. The input and output power spectral densities of the time-varying cavity ($r_2=0.95$) are plotted for a pulse of width $T_R$ oscillating and carrier frequency 0.25 free spectral range ("FSR") away from cavity resonance frequency. Plot is normalized to corresponding maximum input power spectral density. Inset depicts input pulse with a rectangular profile except for sinusoidal edges accounting totally for 25% of pulse width.

FIG. 2C depicts input and output power spectral densities with respect to a specific cavity resonance frequency. Input reflectivity of time-varying cavity can be switched after the pulse enters the cavity. An output spectrum of a time-varying cavity ($r_2=0.95$) can be plotted for a pulse of width $0.5T_R$ oscillating at a cavity resonance frequency. The plot can be normalized to corresponding maximum input power spectral density. FIG. 2C depicts the multiplication factor between input and output power spectra of time-varying cavity, which constitutes spectral compression.

FIG. 2D depicts input and output power spectral densities with respect to a specific cavity resonance frequency. Input reflectivity of time-varying cavity can be switched after the pulse enters the cavity. The input and output power spectral densities of the time-varying cavity ($r_2=0.95$) are plotted for a pulse of width $T_R$ oscillating and carrier frequency 0.25 free spectral range ("FSR") away from cavity resonance frequency. The plot can be normalized to corresponding maximum input power spectral density. The inset of FIG. 2D depicts input pulse with a rectangular profile except for sinusoidal edges accounting totally for 25% of pulse width. These plots show that spectral compression can be possible even when the carrier frequency of the input pulse can be not aligned to a specific resonant frequency.

Still referring to FIG. 2D, reference to "pulse width" refers to the entire time window over which the intensity can be nonzero. The pulse can be input into the cavity between $t=0$ and $1=T_R$. In case of the time-varying cavity, the input mirror reflectivity can be switched from 0 to 1 at $1=T_R$. The output power spectrum for both the FP cavity ($r_1=r_2=0.95$) and the time-varying cavity ($r_2=0.95$) are plotted in FIGS. 2A and 2B, respectively. This clearly illustrates the entirely different spectral filtering and spectral compressing operations performed by the FP cavity and the time-varying cavity, respectively. For a similar pulse oscillating at the same resonance frequency but with a pulse width of 0.5 $T_R$, the output of the time-varying cavity can be plotted in FIG. 2C. The presence of multiple peaks, of relatively higher power, can be explained by the fact that the input power present at different cavity resonance frequencies gets enhanced by the same factor (see inset of FIG. 2C). Hence, it can be ideal to roughly match the width of the pulse with the cavity roundtrip time $T_R$ so that the energy can be compressed mostly into a single spectral peak. Also, if the carrier frequency doesn't coincide with the cavity resonance, the spectral compression peaks occur asymmetrically with respect to the input spectral envelope. This can be illustrated in FIG. 2D for an input pulse of width $T_R$, oscillating at a carrier frequency of 0.25FSR away from a cavity resonance. Similar results are expected for other input pulse shapes, provided that the pulse duration can be appropriately matched to the cavity round trip time.

A spectral compression factor can be defined as the ratio between the full width at half maximum ("FWHM") of the input and output power spectral densities. When spectral compression occurs, the peak power spectral density of the output can be enhanced by approximately the factor by which the FWHM bandwidth can be decreased. Eq. 3 indicates that enhancement in peak power spectral density at the output of time-varying cavity increases, if $|r_2|$ can be increased. Hence, the spectral compression factor which can be proportional to the enhancement in peak power also increases with $|r_2|$. This can be explained by the fact for an increased value of $|r_2|$, the pulse executes more round trips within the cavity and hence generates more copies of the input pulse. However, in case of cavities with nonzero cavity loss, this results in a trade-off between achievable spectral compression and integrated loss. In case of nonzero loss, Eq. 2 assumes the following form, where $2\alpha L$ represents the loss per roundtrip within the cavity.

$$E_{out}(\omega) = \frac{t_2 e^{-\frac{\alpha L}{2}} e^{-j\omega \frac{T_R}{2}}}{1 - r_2 e^{-\alpha L} e^{-j\omega T_R}} E_{in}(\omega). \quad (4)$$

To illustrate this trade-off, a pulse can be considered as shown in the inset of FIG. 2D of width $T_R$ at a carrier frequency coinciding with one of the resonance modes, that can be input into the time-varying cavity. The achievable spectral compression, integrated loss and the ratio of peak output and input power spectral densities are analytically calculated and plotted in FIG. 3 as a function of $|r_2|$, for different values of roundtrip cavity loss.

Figure 3A:
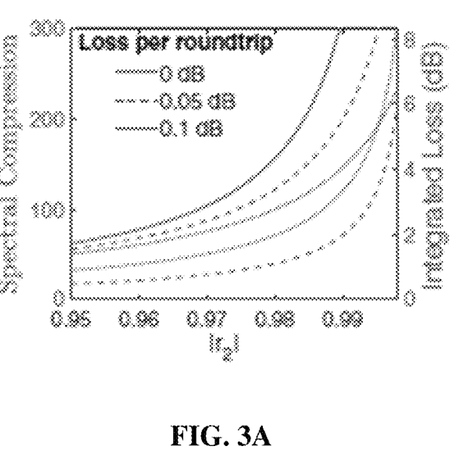
FIG. 3A depicts spectral compression (blue) and integrated loss (red) as a function of $|r_2|$ for different values of cavity loss per roundtrip: 0 dB (solid), 0.05 dB (dashed), and 0.1 dB (dotted) considering a pulse of width $T_R$ as input into the time-varying cavity.

FIG. 3A depicts spectral compression (blue) and integrated loss (red) as a function of $|r_2|$ for different values of cavity loss per roundtrip: 0 dB (solid), 0.05 dB (dashed), and 0.1 dB (dotted) considering a pulse of width $T_R$ as input into the time-varying cavity. FIG. 3A illustrates the fact that both the spectral compression and integrated loss increase with $|r_2|$ in case of nonzero cavity losses. However, the ratio of output and input peak power spectral densities depends on both spectral compression and integrated loss. Hence, it attains a maximum at an optimal value of $|r_2|$, depending on the cavity loss parameter as shown in FIG. 3B.

Figure 3B:
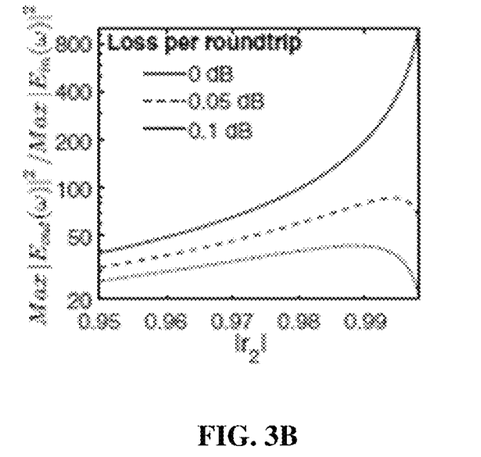
FIG. 3B depicts a ratio of peak output and input power spectral densities (black) as a function of $|r_2|$ for different values of cavity loss per roundtrip: 0 dB (solid), 0.05 dB (dashed), and 0.1 dB (dotted) considering a pulse of width $T_R$ as input into the time-varying cavity.

FIG. 3B depicts a ratio of peak output and input power spectral densities (black) as a function of $|r_2|$ for different values of roundtrip cavity loss: 0 dB (solid), 0.05 dB (dashed), and 0.1 dB (dotted) considering a pulse of width $T_R$ as input into the time-varying cavity. The maximum ratio decreases with the increase in cavity loss per roundtrip. As depicted in FIG. 3B, one or more embodiments clearly show the limitations on achievable spectral compression in a time-varying cavity with nonzero intracavity losses.

In theory, rapid switching of the input mirror reflectivity can be assumed. In practice however, nonzero rise time can be considered for switching the input mirror reflectivity. For any generic input mirror reflectivity function $r_1(t)$ or transmission $t_1(t)$ and input pulse shape, the output and input pulses for a cavity with no internal loss or no cavity loss can be related using a recursive relation, which then can be expressed as a Fredholm integral that possesses a Liouville-Neumann series solution, as shown in Eq. 5.

$$E_{out}(t) = t_1\left(t - \frac{T_R}{2}\right)t_2 E_{in}\left(t - \frac{T_R}{2}\right) + r_1\left(t - \frac{T_R}{2}\right)r_2 E_{out}(t - T_R) \quad (5)$$

-continued
$$E_{out}(t) = \left\{\sum_{m=0}^{\infty} t_1\left[t - \left(mT_R + \frac{T_\square}{2}\right)\right]t_2 \times E_{in}\left[t - \left(mT_R + \frac{T_R}{2}\right)\right]\prod_{n=0}^{m} b_n\right\},$$

$$b_0 = 1, b_n = r_1\left[t - \left(nT_R - \frac{T_R}{2}\right)\right]r_2 \; \forall \, n \geq 1.$$

In case of nonzero rise time, a finite amount of power can be reflected back onto the input side resulting in a contribution to insertion loss due to reflection loss. Also, the function $r_1(t)$ can be going to change the temporal waveform of the input pulse affecting the spectral purity of the output. Here, spectral purity can be defined as the ratio between the first and second highest peaks in the output power spectral density. Ideally, higher spectral purity and lower insertion loss can be preferred. Hence, spectral purity and insertion loss can be viewed as performance metrics for spectral compression. The arrival time of the input pulse for a given pulse width and $r_1(t)$ can be optimized to realize either maximum spectral purity or minimum insertion loss.

Figure 4A:
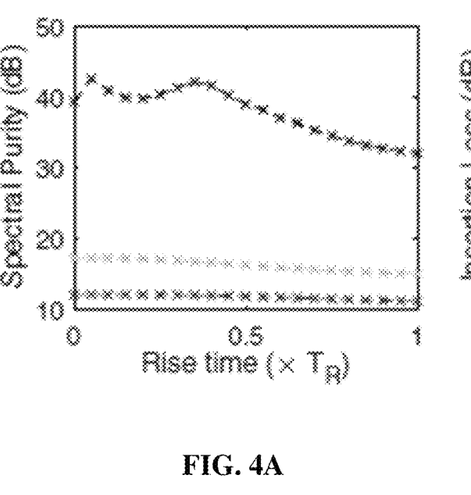
FIG. 4A depicts simulated spectral purity while optimizing for minimum insertion loss as a function of rise time of $r_1$ (t). $r_1$ (t) is assumed to have raised cosine form as shown in the inset on FIG. 4B, where the red arrow indicates the rise time. Trends are shown for input pulses of three different pulse widths.
Figure 4B:
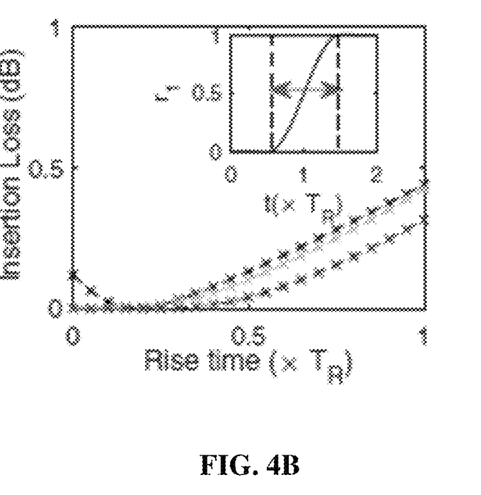
FIG. 4B depicts simulated insertion loss while optimizing for minimum insertion loss as a function of rise time of $r_1(t)$. $r_1(t)$ is assumed to have raised cosine form as shown in the inset, where the red arrow indicates the rise time. Trends are shown for input pulses of three different pulse widths.

FIGS. 4A and 4B graphically depict the simulated spectral purity and insertion loss, while optimizing for minimum insertion loss, as a function of rise time of $r_1(t)$ for different values of input pulse width. In these plots the cavity loss can be assumed to be zero. FIG. 4A depicts simulated spectral purity while optimizing for minimum insertion loss as a function of rise time of $r_1(t)$ where $r_1(t)$ can be assumed to have raised cosine form as shown in the inset on FIG. 4B, where the red arrow indicates the rise time. Trends are shown for input pulses of three different pulse widths. FIG. 4B depicts simulated insertion loss while optimizing for minimum insertion loss as a function of rise time of $r_1(t)$ where $r_1(t)$ can be assumed to have raised cosine form as shown in the inset, where the red arrow indicates the rise time. Trends are shown for input pulses of three different pulse widths.

The input pulses are again as shown in inset of FIG. 2D and oscillating at one of the resonance frequencies of the cavity. The cavity can be assumed to have zero intracavity loss and an $r_2$ of 0.95. $r_1(t)$ can be assumed to be raised cosine function, increasing from 0 to 1 for the given rise time as shown in the inset of FIG. 4B. The spectral purity can be observed to have an overall decreasing trend with the increase in rise time. The highest spectral purity can be associated with the case $T_{pulse}=1.2\times T_R$, which can be explained by the relatively lower input power spectral density at adjacent cavity resonance frequencies. The insertion loss can be seen to monotonically increase from zero with the rise time of $r_1(t)$ when $T_{pulse} \leq T_R$ and can be within 0.5 dB for all values of considered rise time and pulse widths. For the case $T_{pulse}=1.2\times T_R$, the insertion loss can be non-zero for all values of rise time and the minimum can be around 0.002 dB. The discussions in this and previous paragraphs illustrate the effect of cavity losses and reflectivity switching rise time on spectral compression performance.

Practically it will be desirable to demonstrate the spectral compression in an integrated photonics platform. One of the primary requirements to realize spectral compression can be the rapid switching of the input mirror reflectivity. With recent advances on on-chip modulators, especially in TFLN, it can be possible to envision the practical demonstration of this concept. Both low loss (~2.7 dB/m), high Q cavities (~$10^7$) and high modulation rates (~100 GHz) have been reported in the TFLN platform. Even though the prior discussions involved FP cavities, it can be extended to other optical cavities and resonators.

In one embodiment, the input coupling can be abruptly switched from 1 to 0 after the pulse enters the cavity while maintaining a weak output coupling to realize spectral compression, eliminating the reflection onto the input side. This concept applies generically to any optical cavity arrangement.

It would be more desirable to realize this spectral compression demonstration on an integrated photonics platform. Hence, the following embodiments use an MRR configured with an MZM that can be implemented on an integrated photonics platform. Here, the voltages applied to MZM are used to control the input and output coupling of the cavity. Any suitable controller 501 for applying such voltages can be used.

Figure 5:
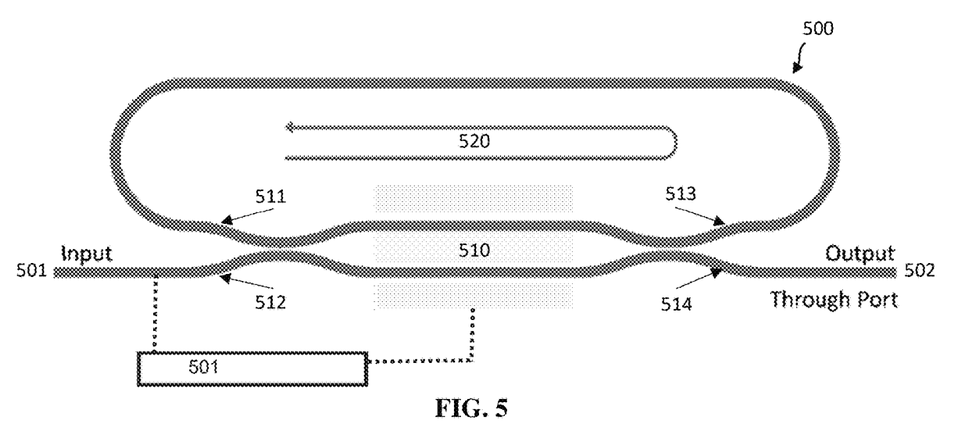
FIG. 5 depicts a spectral compression device utilizing an MRR and MZM, according to one or more embodiments provided herein.

FIG. 5 depicts a spectral compression device 500 utilizing an MRR and MZM, according to one or more embodiments provided herein. Input photon pulses 501 enters an input port 512 of the MZM 510 and exits an output port 513. The photon travels the MRR 520 until it reenters the MZM 510 through input port 511, where it exits the MZM 510 to continuously loop. Spectrally compressed photons 502 exit the spectral compression device 500 through outlet port 514 due to the MZM 510 being in a near bar state.

The fast switchable MZM 510 can be incorporated into an on-chip micro-resonator. The cavity or resonator can be formed by connecting the first output of an MZM switchable coupler back to its first input using a low-loss looping waveguide, forming a cavity such as an MRR 520. This allows the input pulse 501 entering through the MZM's second input 512 to be coupled with high efficiency into the cavity while the MZM 510 can be in the cross state, after which the light can be trapped due to rapidly switching the MZM 510 to a nearly bar state to allow only a few percent output coupling through its second output 514.

Still referring to FIG. 5, the MZM can be in the cross state. When the MZM 510 can be in the cross state, light 501 entering the second input port 512 can be connected directly to the first output 513 of the MZM 510 which can be connected to the MRR 520. In this way, an input pulse 501 can be coupled into the cavity. Before the light travels around the looping waveguide 520 and arrives back at the first input port 511 of the MZM 510, the voltage controls to the MZM 510 are rapidly switched, such that the MZM 510 enters a state close to the bar state. In particular, in this close to the bar state, most of the light that re-enters the MZM 510 on its first input port 511 can be connected back to the looping waveguide 520 through its first output port 513. In this way, the input pulse can be captured in the cavity. Only a small fraction of the light crosses from the first input port 511 to the second output port 514. This small fraction 502 has been coupled out of the cavity and exits the spectral compression device 500.

This combination of MRR and MZM allows the input pulse to be coupled with high efficiency into the cavity, after which the light can be trapped. The losses reported in TFLN platforms are around ~2.7 dB/m in straight waveguide sections, ~0.1 dB for a phase shifter of 0.5 cm with a $V\pi$ value of 4.4V and a 3-dB bandwidth of ~100 GHz. The dispersion in LN microring resonators can be considered negligible for the relatively long input pulses that will be appropriately matched to the cavity round trip time. Consider a cavity of net length 1.5 cm, out of which 0.5 cm accounts for the phase shifter region, the round trip time of the cavity can be around 110 ps. 100 GHz modulation rate corresponds to a rise time of few ps that can be considered as rapid switching when compared to the roundtrip time of 110 ps. For an input pulse profile as shown in inset of FIG. 2D of width 110 ps, taking the losses discussed above into account (~0.13 dB per roundtrip while assuming ideal splitter), it can be possible to achieve a spectral compression factor of 92 (output spectral width of ~100 MHZ) and a peak power spectral density enhancement of ~33 with a net insertion loss of around 2.5 dB while maintaining $r_2$=0.98. However, if the losses in the phase shifter section, which accounts for a significant portion of total internal cavity loss, could be reduced to the level of the straight waveguide section, it would be possible to achieve a spectral compression factor of ~208, or an output spectral width of ~44 MHZ, and a peak power spectral density enhancement of ~93 for a net insertion loss of 1.7 dB while maintaining $r_2$=0.99. The net insertion loss can be reduced to ~0.25 dB, but at a reduced spectral compression factor of ~36, or an output spectral width of ~256 MHz and a peak power spectral density enhancement of ~22, while maintaining $r_2$=0.92.

Figure 6:
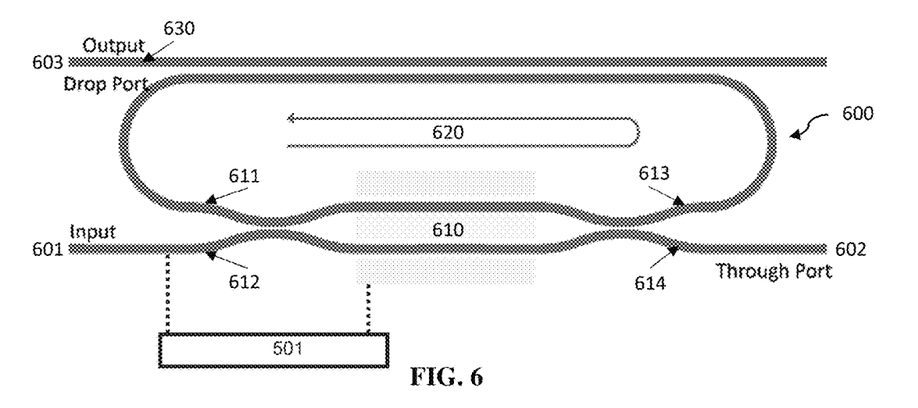
FIG. 6 depicts a spectral compression device utilizing an MRR, MZM, and a drop port, according to one or more embodiments provided herein.

FIG. 6 depicts a spectral compression device 600 utilizing an MRR, MZM, and a drop port according to one or more embodiments provided herein. Input photon pulses 601 enters an input port 612 of the MZM 610 and exits an output port 613. The photon travels the MRR 620 until it reenters the MZM 610 through input port 611, where it exits the MZM 610 to continuously loop. Undesirable photons 602 exit the spectral compression device 600 through the outlet port 614. Spectrally compressed photons 603 exit the device 600 through the drop port 630 due to the undercoupled nature of the drop port 630.

Still referring to FIG. 6, the addition of a fixed drop port 630 can be coupled to the MRR 620 of the previous embodiment. If the MZM can be initially set to an imperfect cross state, or has an imperfect extinction ratio, some input light 601 travels directly to the second output 614 of the MZM 610 and will then overlap in the same waveguide as the desired spectrally compressed output that eventually results. With a drop port 630 coupled with the MRR 620, overlap with any such undesired input light 602 can be avoided, because the undesired light 602 can be output through the second outlet port 614 and can be therefore separated from the drop port 630 of the MRR 620. This avoids potential degradation of the desired spectrally compressed output 603. In an ideal embodiment, after input light 601 has entered MRR 620 through MZM 610, the MZM 610 can be switched such that it can be as close to the bar state as possible. The MZM 610 being as close to the bar state as possible can minimize loss of light captured in the MRR 620 to output port 614, allowing as much of light captured in MRR 620 as possible to exit from drop port 630 as desired spectrally compressed output 603.

Figure 7:
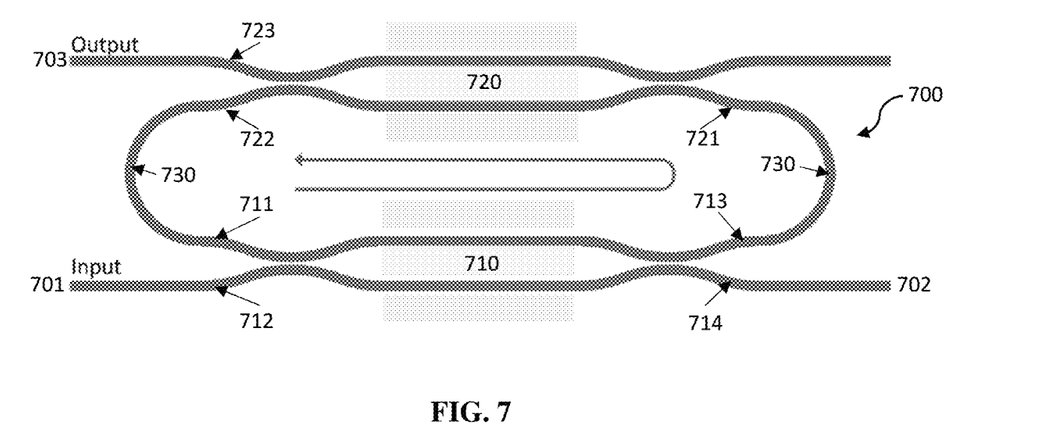
FIG. 7 depicts a spectral compression device utilizing two MZMs and two wave guides, according to one or more embodiments provided herein.

FIG. 7 depicts a spectral compression device 700 utilizing two MZMs and two wave guides, according to one or more embodiments provided herein. Input photon pulses 701 enters an input port 712 of the first MZM 710 and exits an output port 713. The photon travels the wave guide 730 until it enters the second MZM 720 through input port 721, where it exits the second MZM 720 through output port 722 to continuously loop through both MZMs 710, 720 and wave guides 730. Undesirable photons 702 exit the first MZM 710 through the outlet port 714. Spectrally compressed photons 703 exit the spectral compression device 700 through outlet port 723 due to the second MZM 720 being in a near bar state.

Referring to FIG. 7, a tunable drop port coupling can be integrated into the previous embodiment by inserting a second MZM 720 into the looping waveguide 730 that forms the MRR. The first input port 711 and first output port 713 of the first MZM 710 are connected to the first output port 722 and first input port 721 of the second MZM 720, respectively. While both MZMs are in the near bar state, the light within the MZMs continuously loops through each MZM in turn. With each loop, undesired light 702 exits the spectral compression device 700 through the outlet port 714, whereas desired spectrally compressed light 703 crosses the second MZM 720 and emerges through its second output port 723. Unlike the fixed drop port 630 of the previous embodiment, the second MZM 720 allows for tunable coupling of light to the drop port, according to one or more embodiments.

Embodiments provided herein further include any one or more of the following attributes:
(a) rapid switching of the input coupling and preferably, substantially faster than cavity round trip time;
(b) input pulse selected to have a duration approximately matched to cavity round trip time;
(c) weak output coupling;
(d) a cavity implemented in bulk optics, including but not limited to a Fabry-Perot cavity; and/or
(e) a cavity implemented in integrated photonics, including but not limited to a MRR All patents and patent applications, test procedures (such as ASTM methods, UL methods, and the like), and other documents cited herein are fully incorporated by reference to the extent such disclosure can be not inconsistent with this disclosure and for all jurisdictions in which such incorporation can be permitted.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below.

The foregoing has also outlined features of several embodiments so that those skilled in the art can better understand the present disclosure. Those skilled in the art should appreciate that they can readily use the present disclosure as a basis for designing or modifying other methods or devices for carrying out the same purposes and/or achieving the same advantages of the embodiments disclosed herein. Those skilled in the art should also realize that such equivalent constructions do not depart from the spirit and scope of the present disclosure, and that they can make various changes, substitutions, and alterations herein without departing from the spirit and scope of the present disclosure, and the scope thereof can be determined by the claims that follow.

We claim:

1. A system for generating spectrally compressed photons from broadband emitted photon pulses, comprising:
   a coupling device comprising an input coupling having a first coupling ratio, wherein the first coupling ratio is configurable, and an output coupling having a second coupling ratio, wherein the second coupling ratio is fixed;
   a cavity connected to the input coupling and the output coupling; and
   a controller in electrical communication with the coupling device, the controller configured to change the first coupling ratio of the input coupling, wherein the spectrally compressed photons are generated from the coupling device through the output coupling.

2. The system of claim 1, wherein the coupling device is substantially linear.

3. The system of claim 1, wherein the input coupling has a first coupling ratio that is configurable from 100% to 0%.

4. The system of claim 1, wherein the cavity includes a Fabry-Perot cavity.

5. The system of claim 1, wherein the cavity includes a microring resonator.

6. The system of claim 1, wherein the input coupling and the output coupling are substantially realized by a Mach-Zehnder modulator.

7. The system of claim 1, wherein the cavity includes a drop port.

8. The system of claim 7, wherein the cavity includes a Mach-Zehnder modulator.

9. The system of claim 1, wherein the cavity has a round-trip time, the broadband emitted photon pulses have a duration time, and the round-trip time and the duration time are substantially matched.

10. The system of claim 9, wherein the input coupling has a switch rate and the switch rate is faster than the round-trip time.

11. A method for generating spectrally compressed photons from broadband emitted photon pulses, comprising:
    emitting a photon pulse;
    capturing the photon pulse inside a coupling device comprising: an input coupling having a first coupling ratio, wherein the first coupling ratio is configurable, and an output coupling having a second coupling ratio, wherein the second coupling ratio is fixed;
    passing the photon pulse through a cavity connected to the input coupling and the output coupling;
    changing the first coupling ratio of the input coupling with a controller in electrical communication with the coupling device, the controller configured to change the first coupling ratio of the input coupling; and
    emitting a spectrally compressed photon pulse from the coupling device through the output coupling.

12. The method of claim 11, wherein the coupling device is substantially linear.

13. The method of claim 11, wherein the first input coupling has a configurable coupling ratio from 100% to 0%.

14. The method of claim 11, wherein the cavity includes a Fabry-Perot cavity.

15. The method of claim 11, wherein the cavity includes a microring resonator.

16. The method of claim 11, wherein the input coupling and the output coupling are realized by a Mach-Zehnder modulator.

17. The method of claim 11, wherein the cavity includes a drop port.

18. The method of claim 17, wherein the cavity includes a Mach-Zehnder modulator.

19. The method of claim 11, wherein the cavity has a round-trip time, the broadband emitted photon pulses have a duration time, and the round-trip time and the duration time are substantially matched.

20. The method of claim 19, wherein the input coupling has a switch rate and the switch rate is faster than the round-trip time.

* * * * *